(12) United States Patent
Wang et al.

(10) Patent No.: US 12,493,519 B2
(45) Date of Patent: *Dec. 9, 2025

(54) HARDWARE MEMORY ERROR TOLERANT SOFTWARE SYSTEM

(71) Applicant: Google LLC, Mountain View, CA (US)

(72) Inventors: Jue Wang, Redmond, WA (US); Daniel Ryan Vance, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,656

(22) Filed: Mar. 4, 2024

(65) Prior Publication Data

US 2024/0202072 A1 Jun. 20, 2024

Related U.S. Application Data

(63) Continuation of application No. 17/551,767, filed on Dec. 15, 2021, now Pat. No. 11,947,420.

(51) Int. Cl.
*G06F 11/10* (2006.01)
*G06F 11/07* (2006.01)
(Continued)

(52) U.S. Cl.
CPC ........ *G06F 11/1068* (2013.01); *G06F 11/076* (2013.01); *G06F 11/0772* (2013.01); *G06F 12/0238* (2013.01); *G06F 12/0882* (2013.01)

(58) Field of Classification Search
CPC .. G06F 11/1068; G06F 11/073; G06F 11/141; G06F 11/261; G06F 11/076;
(Continued)

(56) References Cited

U.S. PATENT DOCUMENTS

| | | | |
|---|---|---|---|
| 6,035,426 A | 3/2000 | Applegate et al. | |
| 8,095,759 B2 | 1/2012 | Abts et al. | |

(Continued)

FOREIGN PATENT DOCUMENTS

| | | | |
|---|---|---|---|
| CN | 111625387 A | 9/2020 | |
| CN | 113536320 A | 10/2021 | |

(Continued)

OTHER PUBLICATIONS

Hsueh et al., Fault Injection Techniques and Tools, Computer, Apr. 1997, 75-82, 30:4, IEEE, New York, NY.

(Continued)

*Primary Examiner* — Albert Decady
*Assistant Examiner* — Enam Ahmed
(74) *Attorney, Agent, or Firm* — Lerner David LLP

(57) ABSTRACT

Systems and methods that enable hardware memory error tolerant software systems. For instance, the system may comprise a host device that instantiates a kernel agent in response to one or more requests to access hardware memory, determines, by the kernel agent based on the received information, whether the request to access memory will cause access to a corrupt memory location, and skip an operation associated with the corrupt memory location in response to determining that the request will access a corrupt memory location. The systems may also include a system that detects software vulnerabilities to hardware memory errors.

16 Claims, 7 Drawing Sheets

(51) Int. Cl.
  *G06F 12/02* (2006.01)
  *G06F 12/0882* (2016.01)
(58) Field of Classification Search
  CPC ............. G06F 12/0238; G06F 11/0772; G06F
       11/0766; G06F 11/0778; G06F 2201/84;
                                    G06F 12/0882
  USPC .......................................................... 714/764
  See application file for complete search history.

(56) References Cited

U.S. PATENT DOCUMENTS

| | | | |
|---|---|---|---|
| 8,443,261 | B2 | 5/2013 | Waldspurger et al. |
| 8,719,661 | B1* | 5/2014 | Gulati ................. G06F 11/1415 714/764 |
| 10,042,695 | B1* | 8/2018 | Karppanen ......... G06F 11/0706 |
| 11,693,581 | B2 | 7/2023 | Ben Dayan et al. |
| 11,720,440 | B2* | 8/2023 | Cherukuri ........... G06F 11/0793 714/764 |
| 2002/0138669 | A1 | 9/2002 | Kadatch et al. |
| 2006/0112136 | A1 | 5/2006 | Shankar et al. |
| 2006/0253740 | A1* | 11/2006 | Ritz .................... G06F 11/0781 714/38.13 |
| 2010/0005366 | A1* | 1/2010 | Dell ........................ G11C 29/70 714/764 |
| 2011/0145632 | A1 | 6/2011 | Waldspurger et al. |
| 2012/0254698 | A1 | 10/2012 | Ozer et al. |
| 2013/0132690 | A1* | 5/2013 | Epstein ................. G06F 12/145 711/159 |
| 2013/0336105 | A1* | 12/2013 | Myrah ................ H04L 41/0672 370/216 |
| 2015/0178243 | A1* | 6/2015 | Lowery ............... G06F 12/0692 709/212 |
| 2015/0220736 | A1 | 8/2015 | Martinez et al. |
| 2015/0293822 | A1 | 10/2015 | Chun et al. |
| 2016/0085467 | A1 | 3/2016 | Saxena et al. |
| 2016/0320994 | A1 | 11/2016 | Chun et al. |
| 2017/0083422 | A1 | 3/2017 | Cheng et al. |
| 2017/0344489 | A1 | 11/2017 | Kapoor |
| 2020/0210272 | A1 | 7/2020 | Zhang et al. |

FOREIGN PATENT DOCUMENTS

| | | |
|---|---|---|
| WO | 2014051550 A1 | 4/2014 |
| WO | 2017131639 A1 | 8/2017 |

OTHER PUBLICATIONS

Bagdasar, Hardware Error Injection, Analysis and Tolerance at Operating System Level, a thesis submitted to Universitat Politécnica de Catalunya (UPC)—Barcelona Tech, Jun. 2018, Chapter 3, Barcelona, Spain. (62 pages).
Li et al., A Realistic Evaluation of Memory Hardware Errors and Software System Susceptibility, Proceedings of the 2010 USENIX Annual Technical Conference, Jun. 2010. (14 pages).
Invitation to Pay Additional Fees for International Application No. PCT/US2022/052967 dated Apr. 14, 2023. 15 pages.
International Search Report and Written Opinion for International Application No. PCT/US2022/052967 dated Jun. 5, 2023. 22 pages.
Office Action for Chinese Patent Application No. 202280082178.8 dated Apr. 23, 2025. 6 pages.

* cited by examiner

100

400

500

HARDWARE MEMORY ERROR TOLERANT SOFTWARE SYSTEM

CROSS REFERENCE TO RELATED APPLICATIONS

The present application is a continuation of U.S. patent application Ser. No. 17/551,767, filed on Dec. 15, 2021, the disclosure of which is incorporated herein by reference.

BACKGROUND

Cloud computing has impacted the way in which enterprises manage computing needs. Cloud computing provides reliability, flexibility, scalability, and redundancy in a cost-effective manner, enabling enterprises to manage their information technology needs without traditional capital investment and maintenance considerations for their own hosted hardware. As cloud computing infrastructure grows to meet growing demand, an effect of this shift is that memory errors that occur in the cloud, if not contained and/or recovered from, can negatively impact customer and user experiences, as well as degrade their trust in the infrastructure. For example, an uncorrectable memory error on a host machine can lead to the host shutting down or crashing abruptly, also resulting in abrupt termination of all hosted virtual machines. With memory allocation to different virtual machines rising to the order of multiple terabytes, uncorrectable memory errors can potentially impact thousands of virtual machines or applications, requiring unacceptably long time periods to reestablish service. Hardware error recovery capability is typically provided via the CPU, e.g., a machine check architecture. Software error recovery capability requires different approaches and implementations than for hardware system.

SUMMARY

Aspects of disclosed technology may include a hardware memory error tolerant software system, a system for detecting vulnerabilities in a software system and/or processes associated with such systems.

For instance, one aspect of the disclosed technology may include a hardware memory error tolerant software system, comprising one or more processing devices, an input for receiving information indicating memory locations at which hardware memory errors are detected and a memory storing instructions that may control operations associated with the one or more processing devices. For example, the instructions may cause the one or more processing devices to instantiate a kernel agent in response to one or more requests to access memory, the kernel agent determining based on the received information whether the request to access memory will cause access to a corrupt memory location, and skip an operation associated with the corrupt memory location in response to a determination that the request will access a corrupt memory location.

In accordance with this aspect of the disclosed technology the received information may comprise information identifying a kernel control path of an operating system of the computing device. Further, the identified kernel control path may comprise one of a kernel control path that performs house keeping operations (e.g., periodic or event driver operations performed by kernel in order to maintain the kernel's internal state and services such as those associated for instance with the Linux kernel) or optimization operations (e.g., CPU, memory or disk usage).

In accordance with this aspect of the technology the request to access memory may comprise a request to access a page in memory. Also, the instructions may cause the one or more processing devices to skip an operation associated with the page in response to the determination that the request will access a corrupt memory location. Wherein to skip an operation may comprise not running a given operation or referencing a fix-up handler that results in redirecting given instructions to a different memory location.

In accordance with this aspect of the disclosed technology the information from a hardware memory error detection system may comprise causing a processor to instantiate a plurality of virtual machines on the host machine, the plurality of virtual machines being associated with a memory address space used to run one or more processes; instantiate a memory injection utility, the memory injection utility injecting one or more hardware memory errors into the memory address space; tune one of a frequency of injection of the one or more hardware memory errors or an error density level of the one or more hardware memory errors injected into the memory address space; detect one or more memory access errors associated with the plurality of virtual machines based on the one or more hardware memory errors injected into the memory address space, the one or more memory access errors providing indication of a possible failure in executing the one or more processes; and correlate the one or more memory access errors detected with one or more memory locations associated with the memory address space. Further in accordance with this aspect of the disclosed technology the error detection system may comprise an analysis utility that aggregates the correlated memory access errors to identify memory locations at which the one or more hardware memory errors are detected; and an output that provides the identified memory locations as the information for input to the hardware memory error tolerant software system.

In accordance with this aspect of the disclosed technology, the instructions may cause the one or more devices to tune the at least one memory address randomly. In another instance, the instructions may cause the one or more devices to vary a number of the plurality of machine instantiated while varying the error density level. Further, the instructions may cause the one or more devices to vary workloads of the plurality of machine instantiated.

Another aspect of the disclosed technology may comprise a for detecting software system vulnerabilities caused by hardware memory errors, comprising a host machine having one or more processing devices and a memory storing instructions that cause the one or more processing devices to: instantiate a plurality of virtual machines on the host machine, the plurality of virtual machines being associated with a memory address space used to run one or more processes, instantiate a memory injection utility, the memory injection utility injecting one or more hardware memory errors into the memory address space, tune one of a frequency of injection of the one or more hardware memory errors or an error density level of the one or more hardware memory errors injected into the memory address space, detect one or more memory access errors associated with the plurality of virtual machines based on the one or more hardware memory errors injected into the memory address space, the one or more memory access errors providing indication of a possible failure in executing the one or more processes, and correlate the one or more memory access errors detected with one or more memory locations associated with the memory address space; and an analysis utility that aggregates the correlated memory access errors to identify memory locations at which the one or more hardware memory errors are detected.

In accordance with this aspect of the disclosed technology the instructions may cause the one or more devices to tune the at least one memory address randomly. Further, the error density level comprises a number of errors randomly injected into a memory location associated with the memory address space. Further still, the instructions may cause the one or more devices to vary a number of the plurality of virtual machines instantiated while varying the error density level. In addition, the instructions may cause the one or more processing devices to vary workloads of the plurality of virtual machines instantiated.

Further in accordance with this aspect of the disclosed technology, the memory address space may comprise an address space used by the plurality of virtual machines instantiated or an entirety of the host machine address space. In addition, the instantiated memory injection utility may filter injecting the hardware memory errors to one of a single row in dual in-line memory module (DIMM), a column in DIMM, or a data line in DIMM.

Another aspect of the disclosed technology may comprise a method for operating a hardware memory error tolerant software system. The method may comprise instantiating, on a host computer, a kernel agent in response to one or more requests to access hardware memory, determining, by the kernel agent based on the received information, whether the request to access memory will cause access to a corrupt memory location, and skipping, by the host computer, an operation associated with the corrupt memory location in response to determining that the request will access a corrupt memory location. In accordance with the method, the received information may comprise information identifying a kernel control path of an operating system of the computing device, the identified kernel control path comprises one of a kernel control path that performs house keeping operations or optimization operations. In accordance with the method, the request to access memory may comprise a request to access a page in memory and the instructions cause the one or more processing devices to skip an operation associated with the page in response to the determination that the request will access a corrupt memory location.

OVERVIEW

Figure 1:
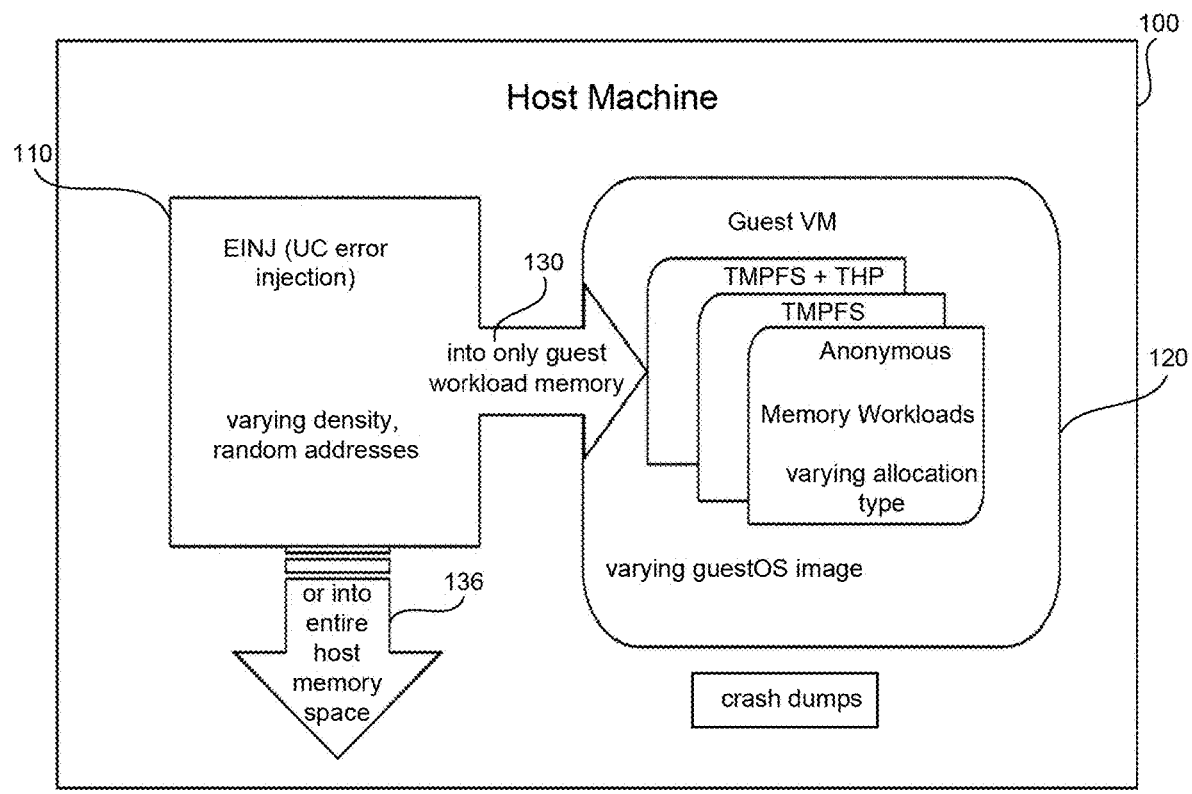
FIG. 1 illustratively depicts functions of a host machine in accordance with an aspect of the disclosed technology.

This technology relates to identifying memory errors and mitigating their impact on host or software systems including allowing such systems to recover from or avoid the impact of such errors.

A host machine is a device with memory and processors configured to host one or more virtual machines. The host machine can implement a host operating system that runs a host kernel. A virtual machine emulates a real computer system and operates based on the computer architecture and functions of the real computer system or a hypothetical computer system, which may include emulating specialized hardware and/or software. An operating system for a virtual machine is its guest operating system ("guest OS") which can include a guest kernel. Memory allocated to the virtual machine is referred to as its guest memory. The guest memory can correspond to portions of underlying physical memory of the host machine running the virtual machine.

During their operating lifetime, some or all of the memory devices on a host machine can fail for a number of reasons, for example through hardware defects or a result of degradation over time or repeated use. Correctable errors typically do not affect normal operation of a host machine. Uncorrectable memory errors can be fatal to a host machine. For example, an uncorrectable memory error may occur in a memory device when bits of data stored are inadvertently flipped from one binary state to another. This can occur, for example, because of manufacturing defects for the memory device, and/or because of magnetic or electrical interference (e.g., cosmos radiation) and temperature effects, which can cause bits to flip randomly. Memory errors can essentially occur at random locations in DRAM chips, as well as random locations in the software system. Although a host machine can implement error monitoring and handling technology to recover from relatively minor errors, recovery is not always possible.

An uncorrectable memory error can occur while a processor of a host machine is accessing memory as part of the execution of one or more instructions. As an example, the instructions can be part of a software routine that the host machine is configured to execute by its host kernel or an application running on the host machine. As part of executing the instructions, the processor accesses memory coupled to the host machine. The memory accessed can be memory reserved for the host machine, or memory allocated to a virtual machine running on the host machine. Memory allocated to a hosted virtual machine by a host machine is referred to as its guest memory. The host maps the guest memory the host's physical memory. When the processor accesses memory on the host machine, it can do so while operating in a kernel context or a user context. In the kernel context, the processor executes instructions that are part of routines or software components of a host kernel for the host machine. The kernel may access guest memory for a variety of different reasons. In general, the kernel may access guest memory as part of performing routines for copying data from guest memory.

Left unchecked, an uncorrectable memory error can cause the host machine to crash or shut down with little warning or clue as to the source of the device's failure. The impact of these uncorrectable memory errors can be particularly significant on host machines hosting virtual machines, and especially when each virtual machine may be allocated with gigabytes or terabytes of guest memory.

Some processors for a host machine can be implemented with a machine-check architecture, providing a mechanism for detecting and reporting errors caused by processors or hardware connected to the processors. A machine-check architecture generally refers to portions of a processor configured for identifying and raising machine-check exceptions (MCEs) which a host kernel can receive and interpret. Although a host kernel, such as a kernel based on the Linux kernel, can be configured to receive and handle MCEs corresponding to some uncorrectable memory errors without defaulting to panic behavior, many uncorrectable memory errors result in a kernel taking default panic behavior. When a kernel defaults to panic behavior, the kernel can freeze or become responsive. The kernel may also cause the host machine executing the kernel to restart or abruptly shut down. If a host machine shuts down, all the virtual machines (VMs) and the software applications supported by the VMs also shut down.

Memory poison recovery aims to make software systems recoverable from memory errors instead of having the hosted virtual machines crash along with the host. Aspects of the disclose technology may comprise a memory poison recovery systems and techniques. For instance, the disclosed technology may include techniques or methods that enable determination of which parts or portion of a software application, code(s), or instruction(s) are vulnerable to hardware memory errors. Hardware memory errors may be injected into the memory of a host device or machine that is running one or more VMs. A VM on the host machine that is running an application may request access to memory locations at which, as a result of the error injection process, errors were injected. Accessing an errored memory location may cause the VM, and thus software application, to crash. Such crashes can be captured via crash dumps. Such crash dumps may be analyzed to detect patterns that indicate a given part of the software or code that crashed as a result accessing a hardware memory location at which an error was injected. In turn, the software application or code may be designed such that when it is deployed in a production environment and encounters such memory errors, a VM, application, or host crash is avoided.

Aspects of the disclosed technology include methods and systems to detect and expose software system vulnerabilities to memory errors. For instance, the disclosed technology may include a memory error injection utility that injects hardware memory errors with various randomization and density levels. It may also include a simulation and stress qualification system that can simulate various VM packing and/or workload patterns under varying injected memory error conditions. It may also include systems that can emulate the crashed process(es) and the associated OS kernel, and detect and report vulnerable software stacks.

The memory injection utility may, for example, reside on a host machine. The host machine may run one or more virtual machines as guest machines. These guest machines may be configured to run various software applications that make use of guest memory allocated to them by the host machine. The memory injection utility may inject hardware memory errors into a location of the physical memory to corrupt that memory location. That corrupted memory location may then correspond to a portion of guest memory (e.g., a corrupted virtual memory page). When a given guest machine accesses the corrupted virtual memory page, it should report an error or crash. The reported error or crash may be stored and subsequently reported. By randomly injecting hardware memory errors while virtual machines run applications that make use of a host's memory, a relationship between the software application and the type of hardware memory errors that impact operations (e.g., cause errors or crashes) may be determined. By tuning the density and address randomness of the injected memory errors, simulation of the random memory errors that may occur in the production environment can be implemented.

The simulation and stress qualification system may then inject various types of random memory errors on a set of machines over a given time period and, for example, repeatedly to achieve run times (e.g., 120 servers in 1 month equates to approximately 10 machine years) that allow for reliable exposure of likely vulnerable spots in the software system (e.g., guest machines running a software application) that correspond to the probability that such vulnerabilities will show up in production workload or a production environment. Hardware errors associated with exposed vulnerabilities may be instrumented, aggregated, and analyzed via a crash instrumentation and analysis system. Instrumented or instrumentation refers to configuring a kernel crash dump to expose the actual stack trace of the crash instructions. Aggregated or aggregation refers sorting and counting, or vice versa, the call stack trace of the crash instructions from one or more runs or cycling of the process of injecting errors. In addition, stack traces may also be depued or filtered to indicate the frequency such that the more or most frequent stack traces are given priority in terms of mitigating their effect. The analysis, for example, may include extracting patterns from the aggregated data that indicate that a certain software application is more prone to a certain memory error. Common patterns may typically include frequent or the most vulnerable call stack to memory errors. Vulnerabilities may then be prioritized for recovery effort based on the result of the analysis. For example, if particular hardware errors caused a disproportionate number of errors or crashes in the software system, such errors may be given higher priority over other errors in terms of error recovery.

Another aspect of the disclosed technology comprises systems and techniques for recovering from software vulnerabilities associated with memory accesses to user space memory from an OS kernel. Based on the results of the analysis of the simulation and stress qualification system, memory poison check assembly methods may be devised such that the OS kernel avoids accessing memory associated with a vulnerability in the software system. For instance, one or more memory poison checker assembly routines may be devised and applied to kernel control paths associated with corrupted memory locations. These memory poison checkers may be considered kernel agents. For instance, before accessing a memory location associated with a vulnerable spot, a kernel agent first attempts to check if there are memory errors in the memory page to be accessed and skips the operation on or associated with the memory page if a memory error is detected.

In effect, the memory poison checker assembly methods or routines may be configured to detect memory errors without crashing the host. For instance, the instruction pointer within the machine check exception (MCE) handler may be configured to fix up the instruction pointer to avoid potentially corrupted memory locations. A fix up table may, for example, may operate to redirect one or more instructions to access a different memory location than a possibly corrupted memory location.

Example Process or Method

FIG. 1 illustratively depicts a functional diagram of a host machine in accordance with at least one aspect of the disclosed technology. As shown, host machine 100 includes an error injection utility 110 and a guest machine 120. For the sake of simplicity only one guest machine is shown. Host machine 100, however, may host or run several VMs 110 in a typical case. Error injection utility 110 provides a hardware injection mechanism that allows for injection of uncorrectable hardware memory errors. Error injection utility 110 may, for example, comprise EINJ functionality available in Linux. The utility 110 may be configured to inject hardware memory errors 130 into the guest workload memory or the memory address space that corresponds to the VM or guest OS memory page(s). Alternatively, the injection utility 110 may be configured to inject hardware memory errors 136 into the entire host memory address space.

Host machine 100 provides a memory poisoning recovery (MPR) framework for injecting/clearing hardware memory errors with aid of a processor memory controller hardware support (e.g., registers in each memory controller). The MPR framework covers various memory accesses by varying parameters to simulate and stress various memory hotness/coldness and exercise various kernel memory error vulnerability paths. Parameters may include one or more of the following: error density, access frequency, allocation type, address range, row/column, guest image, and guest memory back-up. Error density refers to the number of errors randomly injected into memory. Access frequency refers to a time gap between memory access cycles by the guest memory workloads. Allocation type refers to workload separation for each of TMPFS (virtual memory file system), TMPFS with transparent hugepage, and anonymous memory. Address range refers to injection of errors into random memory addresses including of the following selectable ranges: entire host physical address space or the address space of the guest workloads. A filter parameter or function allows injected addresses to be filtered to a single row, a single column, or data line (DQ) in DIMM, or a set of rows/columns/DQs to allow for simulation of memory poisoning as closely as possible actual memory poisoning in a production environment. Guest image refers centos, ubuntu, redhat, sles, and specific versions. Guest memory back-up refers to how guest memory is backed up on the host, e.g., shmem, tmpfs, or hugetlb.

Figure 2:
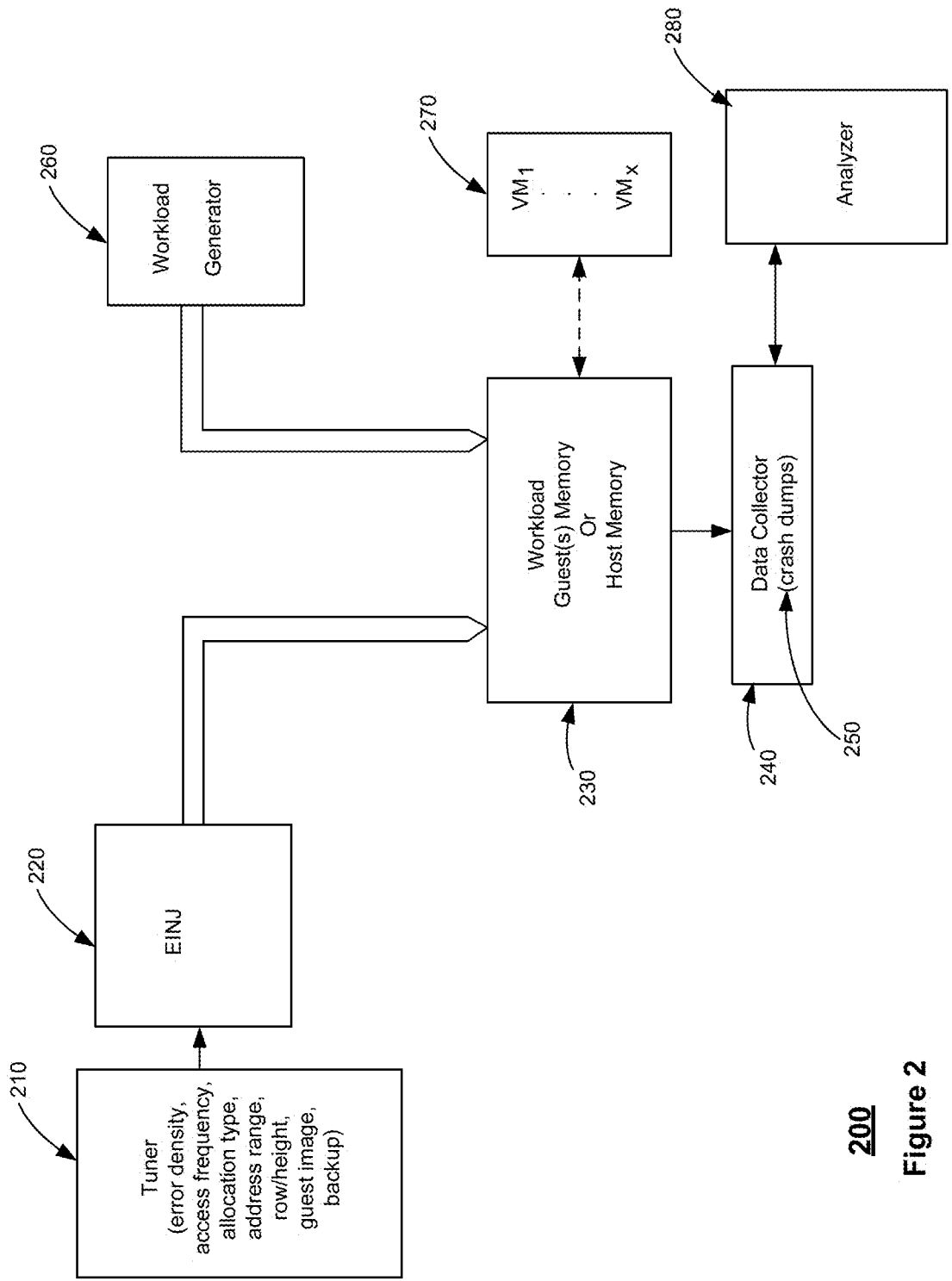
FIG. 2 illustratively depicts a system in accordance with an aspect of the disclosed technology.

FIG. 2 depicts a system 200 in accordance with an aspect of the disclosed technology. As shown, the system 200 includes a tuner 210 communicatively coupled to an error injection module 220. The error injection module 220 is coupled to memory 230 so as to be able to inject memory errors based on adjustment of the tuning parameters of tuner 210. The error injection module 220 may, for example, inject an error into the machine check exception (MCE) registers of the memory 230 indicating that a particular bit location in the memory (e.g., DRAM) is experiencing an uncorrectable memory error. In some examples, errors can be injected into registers of a memory controller of CPU cores. The memory 230 is followed by a data collector 240 that collects data relating to the operations of the memory 230. The data collector 240 may, for example, collect data related to crashes and output that data as crash dumps 250.

The system 200 also includes workload generator 260. Workload generator 260 provides the functionality to adjust the VM packing, work patterns and other metrics that impact the workload experienced by memory 230. The workload generator 260, for example, may cause the instantiation of multiple VMs, as depicted at block 270, to stress the system while at the same time tuner 210 may set different parameters for different time periods to vary injected memory conditions. The VMs may be configured to run real world applications, e.g., a banking application, under real world conditions. By tuning the errors injected into memory under different workload conditions real conditions may be created to expose potentially vulnerable areas in the software system, e.g., the software application.

The system 200 further includes an analyzer 280 that is provided the collected data, including crash dumps 250. The analyzer 280 aggregates the data it receives and extract patterns from the aggregated data. For example, the analyzer may for example determine that the software system is designed such that certain memory accesses occur at greater frequency than others, e.g., hot pages. In contrast, the analyzer may determine that certain pages are being accessed at much lower frequency, e.g., cold pages. The analyzer 280 may also determine the type of memory backing required of the software system (e.g., the application running on the VMs). More generally, the analyzer 280 collects and aggregates stack traces from crash dumps of the memory error caused crashes. From the aggregated stack traces, the analyzer identifies the most frequent code paths, instruction locations that the memory error will affect. These code paths/instruction locations will then be cross referenced with the source code to aid understanding the actual software virtual address space behind the memory error source (why the errors occur frequently in them) and how to make the memory access tolerate memory errors. The analyzer 280 also collects information such as thread/process name, execution context being kernel/user space, the backing memory type of the page with errors (e.g., HugeTLB or TMPFS or anonymous memory) as well as the time of crash hence the time since error being injected into the system till the time of it causing crash.

Figure 3:
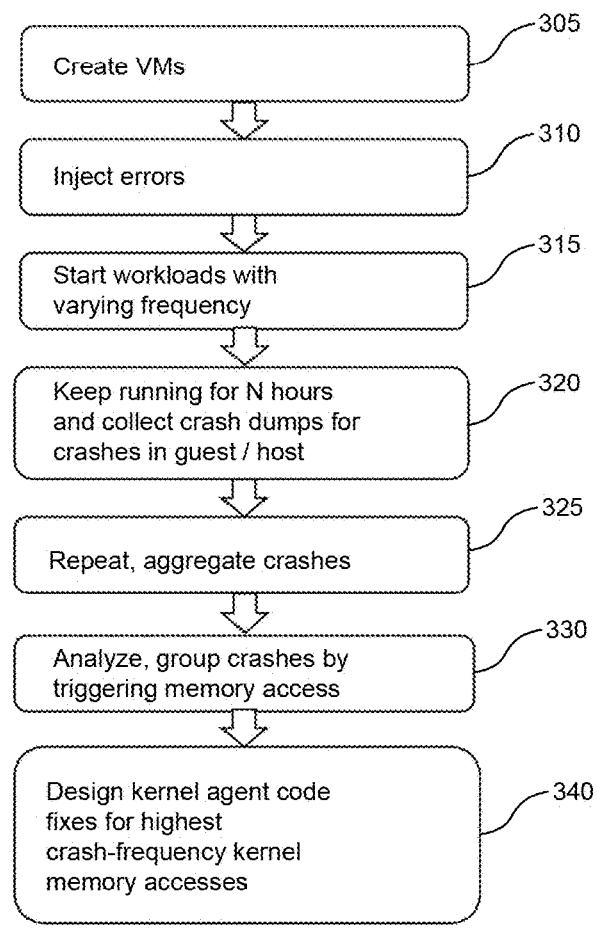
FIG. 3 illustratively depicts a method in accordance with an aspect of the disclosed technology.

FIG. 3 illustratively depicts a process or method 300 in accordance with an aspect of the disclosed technology. The method starts with the creation of a set of VMs, block 305. The VMs are created on a host machine as discussed above. At block 310, errors are injected into the memory of the host machine running the VMs. The errors are injected with random density and/or other parameter settings. At block 315, workloads are created to run on the VMs with varying frequency. At block 320, the host machine keeps the VMs running under the workload and error injection conditions for N hours and collects data such as crash dumps for crashes in the host and guests or VMs. The run time N and number of VMs or host machines can be selected so as to simulate long term behavior of the software system. For example, 10 machine years may be achieved under certain conditions with 120 servers running for approximately 1 month. Blocks, 305, 310, 315 and 320 are repeated and the crash dumps are aggregated as shown at block 325. At block 330, the crashes are analyzed and grouped by the memory access that triggered a crash.

At block 350, the output of the analysis may be used to design kernel agent code fixes such as for example redesigned the code to address the highest crash-frequency memory kernel memory accesses. As an example, memory poison checker assembly routines may be developed based on the analysis to check for hardware memory errors before accessing memory associated with a portion of the code or instruction that exhibit vulnerability during the analysis. These memory poison checker routines actually are invoked from these vulnerable kernel code paths, which are kernel agents. These kernel agents are kernel threads responsible for particular tasks such as page table scanning for memory access cold/hotness detection; sparse page compaction etc.

Figure 4:
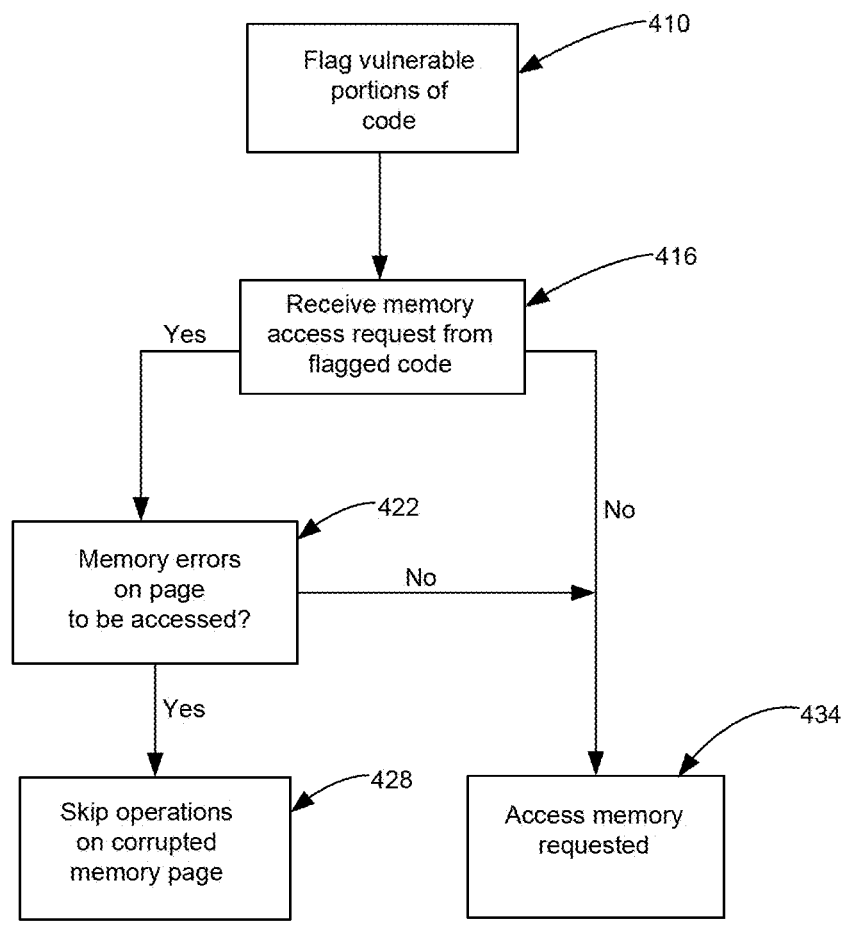
FIG. 4 illustratively depicts a method in accordance with an aspect of the disclosed technology.

FIG. 4 is a diagram that illustratively depicts an example of how such a method may operate. Based on the analysis output from the analyzer, vulnerable portions of the software application, code or instruction may be flag, as depicted at block 410. At block 416, when a memory access request is received from the flagged code/instruction, etc., the kernel agent checks if there memory errors on the page the flagged code/instructions wants to access at block 422—for example, the OS kernel may scan the memory array for the memory location(s) for which access is requested. If an error exists on the page, at block 428, operations associated with the corrupted memory page are skipped and the potential uncorrectable memory error is avoided. This thus avoids a potential crash of the host machine. If no error exists on the page, then then the memory access request may be allowed as indicated at block 434.

In another example, the output of the analyzer may used to tag instructions or code such that when an error is detected a fix up handler may be invoked. For instance, for instructions that are tagged as vulnerable requests access to an errored memory location, a fix up handler checks for a fix up table that redirects the instructions to a different memory location than included in the access request. This thus avoids the errored memory page or location and a potential crash of the host machine. This aspect of the technology may be implemented within a kernel agent in psuedo code as follows for example:

```
Before:
for (large loop over a large address space) {
memory_access(page); <=== Vulnerable to memory error and crash at
this spot frequently.
}
After:
for (large loop over a large address space) {
if (poison_checker(page))
continue; <== Skip the memory page with memory errors.
memory_access(page); <=== Now no longer will only access pages
without memory errors.
}
```

Figure 5:
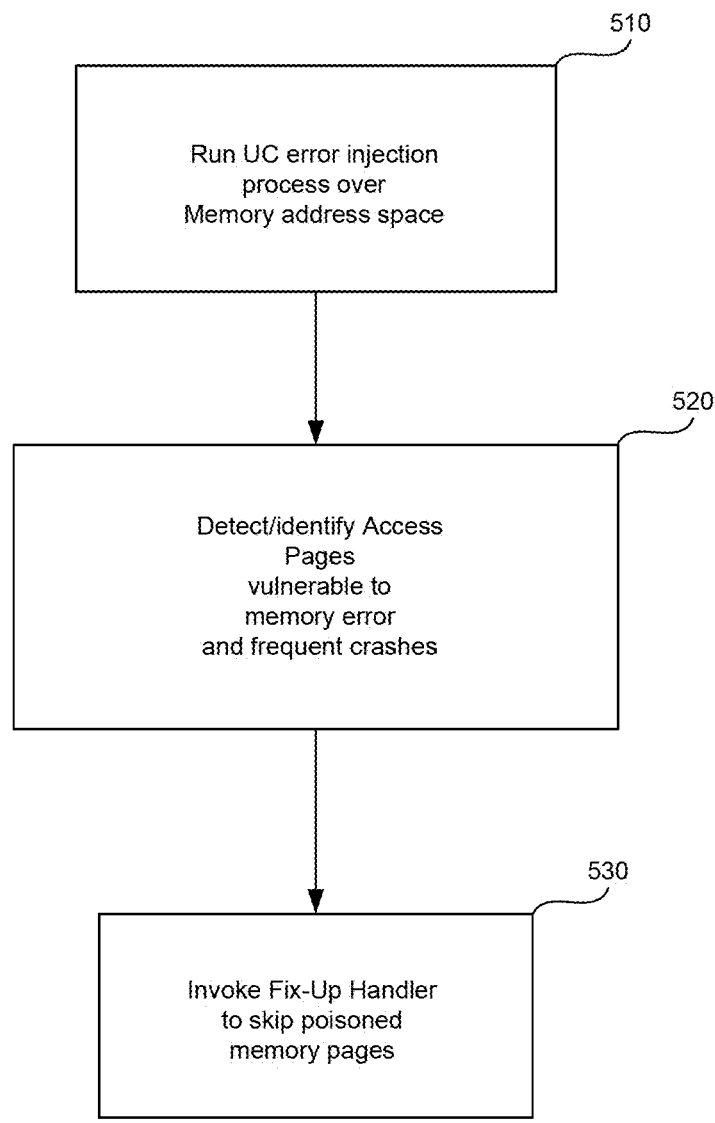
FIG. 5 illustratively depicts a method in accordance with an aspect of the disclosed technology.

FIG. 5 is a diagram showing an example of method 500 that may be implemented in accordance with this aspect of the disclosed technology. As shown, at step 510 the error injection process described above is run over the memory address space. At block 520 memory access pages that are detected as vulnerable to memory error and frequent crashes are collected or identified. Such vulnerable memory access pages may then used at block 530 by a fix-up handler to skip those pages (e.g., "poisoned memory pages") in the production environment.

Figure 6:
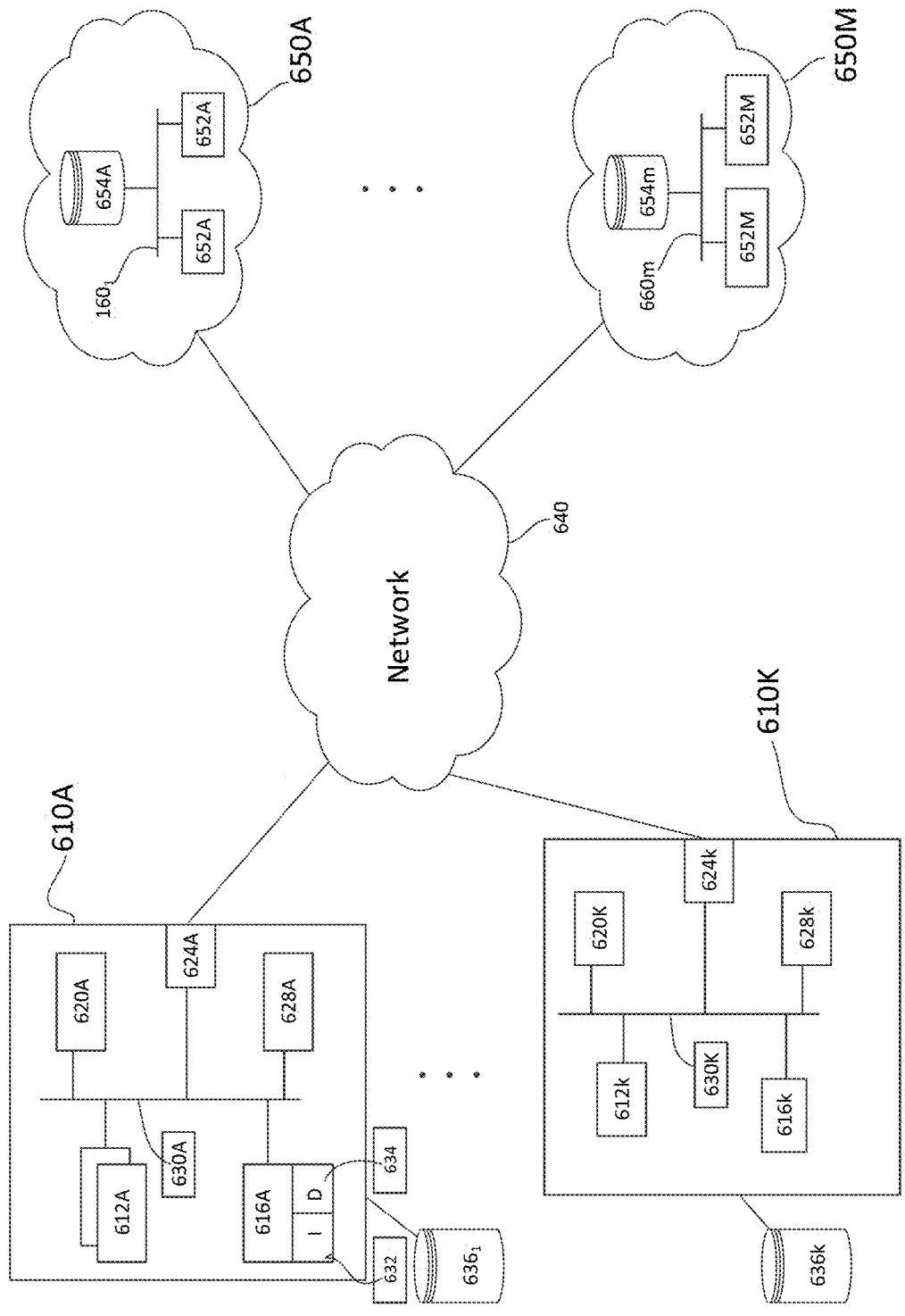
FIG. 6 illustratively depicts a system environment in accordance with one or more aspects of the disclosed technology.

FIG. 6 is a block diagram of an example system 600, in accordance with aspects of the disclosure. System 600 includes one or more computing devices 610A-K, including devices 610A, K and optionally one or more other devices (not shown). In some implementations, the system 600 includes a single computing device 610A which operates as host machine 100, e.g., as a simulation and stress qualification system as described above. The system 600 also includes a network 640 and one or more cloud computing systems 650A-M, which can include cloud computing systems 650A and 650M. In some implementations, the system 600 includes a single cloud computing system 650A. Computing devices 610A-K may include computing devices located at customer locations that make use of cloud computing services. For example, if the computing devices 610A-K are located at a business enterprise, computing devices 610A-K may use cloud systems 650A-M as part of one or more services that provide software applications to the computing devices 610A-K.

As shown in FIG. 6, the computer devices 610A-K may respectively include one or more processors 612A-K, memory 616A-K storing data (D) 634A-K and instructions (I) 632A-K, displays 620A-K, communication interfaces 624A-K, and input systems 628A-K, which are shown as interconnected through network 630A-K. Each computing device 610A-K can be coupled or connected to respective storage device 636A-K, which may include local or remote storage, e.g., on a Storage Area Network (SAN), that stores data.

Each computing device 610A-K may include a standalone computer (e.g., desktop or laptop) or a server. The network 630 may include data buses, etc., internal to a computing device, and/or may include one or more of a local area network, virtual private network, wide area network, or other types of networks described below in relation to network 640. Memory 616A-K stores information accessible by the one or more processors 612A-K, including instructions 632A-K and data 634A-K that may be executed or otherwise used by the processor(s) 612A-K. The memory 616A-K may be of any type capable of storing information accessible by a respective processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 632A-K may be any set of instructions to be executed directly (such as machine code) or indirectly (such as scripts) by the processor. One or more instructions executed by the processors can represent an operation performed by the processor. For example, the instructions may be stored as computing device code on the computing device-readable medium. In that regard, the terms "instructions," "routines," and "programs" may be used interchangeably herein, which are executed by the processor to perform corresponding operations. The instructions may be stored in object code format for direct processing by the processor, or in any other computing device language including scripts or collections of independent source code modules that are interpreted on demand or compiled in advance.

The data 634A-K may be retrieved, stored, or modified by processor(s) 612A-K in accordance with the instructions 632A-K. As an example, data 634A-K associated with memory 616A-K may include data used in supporting services for one or more client devices, an application, etc. Such data may include data to support hosting web-based applications, file share services, communication services, gaming, sharing video or audio files, or any other network based services.

Each processor 612A-K may be any of any combination of general-purpose and/or specialized processors. The processors 612A-K are configured to implement a machine-check architecture or other mechanism for identifying memory errors and reporting the memory errors to a host kernel. An example of a general-purpose processor includes a CPU. Alternatively, the one or more processors may be a dedicated device such as a FPGA or ASIC, including a tensor processing unit (TPU). Although FIG. 6 functionally illustrates the processor, memory, and other elements of each computing device 610A-K as being within a single block, it will be understood by those of ordinary skill in the art that the processor, computing device, or memory may actually include multiple processors, computing devices, or memories that may or may not be located or stored within the same physical housing. In one example, one or more of the computing devices 610A-K may include one or more server computing devices having a plurality of computing devices, e.g., a load balanced server farm, that exchange information with different nodes of a network for the purpose of receiving, processing, and transmitting the data to and from other computing devices as part of customer's business operation.

Computing devices 610A-K may include displays 620A-K, e.g., monitors having a screen, a touch-screen, a projector, a television, or other device that is operable to display information. The displays 620A-K can provide a user interface that allows for controlling the computing device 610A-K and accessing user space applications and/or data associated VMs supported in one or more cloud systems 650A-M, e.g., on a host in a cloud system. Such control may include for example using a computing device to cause data to be uploaded through input system 628A-K to cloud systems 650A-M for processing, cause accumulation of data on storage 636A-K, or more generally, manage different aspects of a customer's computing system. In some examples, computing devices 610A-K may also access an API that allows it to specify workloads or jobs that run on VMs in the cloud as part of IaaS (Infrastructure-as-a-System) or SaaS (Service-as-a-System). While input system 628 may be used to upload data, e.g., a USB port, computing devices 610A-K may also include a mouse, keyboard, touchscreen, or microphone that can be used to receive commands and/or data.

The network 640 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, Wi-Fi, HTTP, etc., and various combinations of the foregoing. Such communication may be facilitated by any device capable of transmitting data to and from other computing devices, such as modems and wireless interfaces. Computing devices 610A-K can interface with the network 640 through communication interfaces 624A-K, which may include the hardware, drivers, and software necessary to support a given communications protocol.

Cloud computing systems 650A-M may include one or more data centers that may be linked via high speed communications or computing networks. A data center may include dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent a given cloud computing system includes more than one data center, those data centers may be at different geographic locations within relatively close proximity to each other, chosen to deliver services in a timely and economically efficient manner, as well provide redundancy and maintain high availability. Similarly, different cloud computing systems are typically provided at different geographic locations.

As shown in FIG. 6, computing systems 650A-M may include host machines 152, storage 154, and infrastructure 160. Host machines 652A-M, storage 654A-M. Infrastructure 660A-M can include a data center within a cloud computing system 650A-M. Infrastructure 660A-M may include one or more host machines, as well as switches, physical links (e.g., fiber), and other equipment used to interconnect host machines within a data center with storage 654A-M. Storage 654A-M may include a disk or other storage device that is partitionable to provide physical or virtual storage to virtual machines running on processing devices within a data center. Storage 654A-M may be provided as a SAN within the datacenter hosting the virtual machines supported by storage 654A-M or in a different data center that does not share a physical location with the virtual machines it supports. One or more hosts or other computer systems within a given data center may be configured to act as a supervisory agent or hypervisor in creating and managing virtual machines associated with one or more host machines in a given data center. In general, a host or computer system configured to function as a hypervisor will contain the instructions necessary to, for example, manage the operations that result from providing IaaS, PaaS (Platform-as-a-Service), or SaaS to customers or users as a result of requests for services originating at, for example, computing devices 610A-K.

Figure 7:
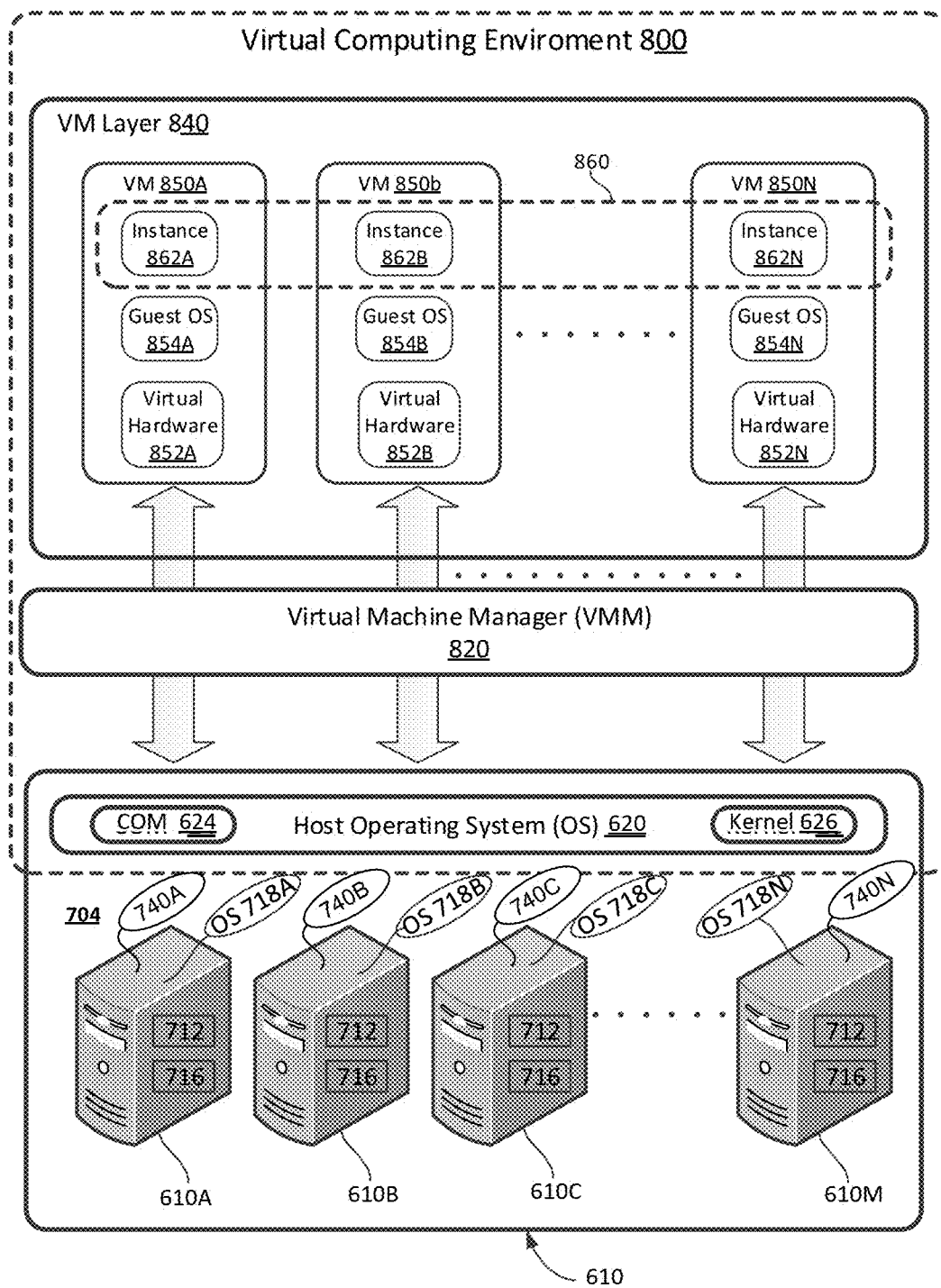
FIG. 7 illustratively depicts a system environment in accordance with one or more aspects of the disclosed technology.

FIG. 7 is a block diagram of an example virtual machine monitor or hypervisor 820 interacting with a host operating system 720 and a virtual machine layer 850, according to aspects of the disclosure. A distributed system 700, such as that shown in relation to cloud systems 650A-M of FIG. 5, includes a collection 704 of host machines 710A-M (e.g., hardware resources 710) supporting or executing a virtual computing environment 800. The virtual computing environment 800 includes a virtual machine monitor (VMM) 820 and a virtual machine (VM) layer 840 running one or more virtual machines (VMs) 850A-N configured to execute instances 862A-B of one or more software applications 860. Each host machine 710A-M may include one or more physical central processing units (pCPU) 712 and associated memory devices 716. While each hardware resource or host 710A-M is shown having a single physical processor 712, any hardware resource 710A-M may include multiple physical processors 712 and/or multiple memory devices 716. Host machines 710A-M also include physical memory devices 716, which may be partitioned by host operating system (OS) 720 into virtual memory and assigned for use by VMs 850 in the VM layer 840, or even the VMM 820 or host OS 720. Physical memory devices 716 may comprise random access memory (RAM) and/or disk storage (including storage 654A-M accessible through infrastructure 660A-M as shown in FIG. 5).

Host operating system (OS) 720 may execute on a given one of the host machines 710A-M or may be configured to operate across a collection, including a plurality, of the host machines 710A-M. For convenience, FIG. 6 shows the host OS 720 as operating across the collection of machines 710A-M. Further, while the host OS 720 is illustrated as being part of the virtual computing environment 800, each host machine 710 is equipped with its own OS 718A-M. However, from the perspective of a virtual environment, the OS on each machine appears as and is managed as a collective OS 720 to a VMM 820 and VM layer 840.

In some examples, the VMM 820 corresponds to a hypervisor 820 (e.g., a Compute Engine) that includes at least one of software, firmware, or hardware configured to create, instantiate/deploy, and execute the VMs 850. A computer associated with the VMM 820 that executes the one or more VMs 850A-N is typically referred to as a host machine (as used above), while each VM 850A-N may be referred to as a guest machine. Here, the VMM 820 or hypervisor is configured to provide each VM 850A-N a corresponding guest operating system (OS) 854, e.g., 854A-N, having a virtual operating platform and manages execution of the corresponding guest OS 854 on the VM 850. In some examples, multiple instances of a variety of operating systems may share virtualized resources. For instance, a first VM 850A of the Linux® operating system, a second VM 850B of the Windows® operating system, and a third VM 850C of the OS X® operating system may all run on a single physical x86 machine.

The distributed system 700 enables a user (through one more computing devices 610A-K) to launch VMs 350A-N on demand, i.e., by sending a command or request 670 (FIG. 5) to the distributed system 700 (including a cloud system 650) through the network 640. For instance, the command/request 670 may include an image or snapshot associated with the host operating system 720 and the distributed system 700 may use the image or snapshot to create a root resource for the corresponding VM. Here, the image or snapshot within the command/request 670 may include a boot loader, the host operating system 720, and a root file system. In response to receiving the command/request 670, the distributed system 700 may instantiate the corresponding VM and automatically start the VM upon instantiation.

A VM emulates a real computer system (e.g., a host machine from host machines 710A-M) and operates based on the computer architecture and functions of the real computer system or a hypothetical computer system, which may involve specialized hardware, software, or a combination thereof. In some examples, the distributed system 700 authorizes and authenticates a user device before launching the one or more VMs 750A-N. An instance 362 of a software application 860, or simply an instance, refers to a VM 850 hosted on the distributed system 700.

The host OS 720 virtualizes underlying host machine hardware and manages concurrent execution of one or more VM instances 850A-N. For instance, host OS 720 may manage VM instances 850A-N and each VM instance 850A-N may include a simulated version of the underlying host machine hardware, or a different computer architecture. The simulated version of the hardware associated with each VM instance is referred to as virtual hardware 352A-N. The virtual hardware 352 may include one or more virtual central processing units (vCPUs) ("virtual processor") emulating one or more physical processors 712 of a host machine 710. The virtual processor may be interchangeably referred to as a "computing resource" associated with the VM instance 850. The computing resource may include a target computing resource level required for executing the corresponding individual service instance 862.

The virtual hardware 852A-N may further include virtual memory in communication with the virtual processor and storing guest instructions (e.g., guest software) executable by the virtual processor for performing operations. For instance, the virtual processor may execute instructions from the virtual memory that cause the virtual processor to execute a corresponding individual service instance 862A-N of the software application 860. Here, the individual service instance 862A-N may be referred to as a guest instance that cannot determine if it is being executed by the virtual hardware 852A-N or the physical data processing hardware 712. A host machine's processor(s) can include processor-level mechanisms to enable virtual hardware 852 to execute software instances 862A-N of applications 860A-N efficiently by allowing guest software instructions to be executed directly on the host machine's processor without requiring code-rewriting, recompilation, or instruction emulation. The virtual memory may be interchangeably referred to as a "memory resource" associated with the VM instances 850A-N. The memory resource may include a target memory resource level required for executing the corresponding individual service instance 862A-N.

The virtual hardware 852A-N may further include at least one virtual storage device that provides runtime capacity for the service on the physical memory hardware 824. The at least one virtual storage device may be referred to as a storage resource associated with the VM instance 850. The storage resource may include a target storage resource level required for executing the corresponding individual service instance 862. The guest software executing on each VM instance 850 may further assign network boundaries (e.g., allocate network addresses) through which respective guest software can communicate with other processes reachable through an internal network 660 (FIG. 6), the external network 640 (FIG. 6), or both. The network boundaries may be referred to as a network resource associated with the VM instance 850.

The guest OS 854 executing on each VM 850A-N includes software that controls the execution of the corresponding individual service instance 862, e.g., one or more of 862A-N of the application 860 by the VM 850. The guest OS executing on a VM instance can be the same or different as the other guest OS 854 executing on the other VM instances 850A-N. In some implementations, a VM instance does not require a guest OS in order to execute the individual service instance 862. The host OS 720 may further include virtual memory reserved for a kernel 726 of the host OS 720. The kernel 726 may include kernel extensions and device drivers, and may perform certain privileged operations that are off limits to processes running in a user process space of the host OS 720. Examples of privileged operations include access to different address spaces, access to special functional processor units in the host machines, such as memory management units, and so on. A communication process 724 running on the host OS 720 may provide a portion of VM network communication functionality and may execute in the user process space or a kernel process space associated with the kernel 726.

The kernel 726 can implement an MCE handler for handling MCEs raised by processors of the host machines 710A-N. Similarly, the guest OS for each VM 850A-N can implement a guest MCE handler for receiving and handling emulated MCEs.

As shown in FIG. 7, host machines may include instructions 740 that may act in accordance with one or more aspects of the disclosed technology. Instructions 740A through 740N may operate as a kernel agent or as a fix up handler that senses potential vulnerable instructions or codes running at VM layer 840 and act to skip potentially corrupted memory locations on a memory device 716. The kernel agent or fix up handler may operate to cause the applications or instructions running at the VM layer to skip other operations associated with the potentially corrupted memory location or be directed to an uncorrupted memory location. Either operation would avoid having the VM or host crash.

Aspects of the disclosed technology may comprise one or more of the following combination of feature sets:

F1. A hardware memory error tolerant software system, comprising:
  one or more processing devices;
  an input for receiving information indicating memory locations at which hardware memory errors are detected; and
  a memory storing instructions that cause the one or more processing devices to:
  instantiate a kernel agent in response to one or more requests to access memory, the kernel agent determining based on the received information whether the request to access memory will cause access to a corrupt memory location, and
  skip an operation associated with the corrupt memory location in response to a determination that the request will access a corrupt memory location.

F2. The system of F1, wherein the received information comprises information identifying a kernel control path of an operating system of the computing device and the identified kernel control path comprises one of a kernel control path that performs house keeping operations or optimization operations.

F3. The system of any one of F1 or F2, wherein the request to access memory comprises a request to access a page in memory.

F4. The system of any one of F1 to F3, wherein the instructions cause the one or more processing devices to skip an operation associated with the page in response to the determination that the request will access a corrupt memory location.

F5. The system of F1, wherein the input receives the information from a hardware memory error detection system comprising:
  instantiate a plurality of virtual machines on the host machine, the plurality of virtual machines being associated with a memory address space used to run one or more processes,
  instantiate a memory injection utility, the memory injection utility injecting one or more hardware memory errors into the memory address space,
  tune one of a frequency of injection of the one or more hardware memory errors or an error density level of the one or more hardware memory errors injected into the memory address space,
  detect one or more memory access errors associated with the plurality of virtual machines based on the one or more hardware memory errors injected into the memory address space, the one or more memory access errors providing indication of a possible failure in executing the one or more processes, and
  correlate the one or more memory access errors detected with one or more memory locations associated with the memory address space; and
  an analysis utility that aggregates the correlated memory access errors to identify memory locations at which the one or more hardware memory errors are detected; and
  an output that provides the identified memory locations as the information for input to the hardware memory error tolerant software system.

F6. The system of F5, wherein the instructions cause the one or more devices to tune the at least one memory address randomly.

F7. The system of any one of F5 or F6, wherein the error density level comprises a number of errors randomly injected into a memory associated with the memory address space.

F8. The system of any one of F5 to F7, wherein the instructions cause the one or more devices to vary a number of the plurality of machine instantiated while varying the error density level.

F9. The system of any one of F5 to F8, wherein the instructions cause the one or more devices to vary workloads of the plurality of machine instantiated.

F10. A system for detecting software system vulnerabilities caused by hardware memory errors, comprising:
  a host machine having one or more processing devices and a memory storing instructions that cause the one or more processing devices to:
  instantiate a plurality of virtual machines on the host machine, the plurality of virtual machines being associated with a memory address space used to run one or more processes,
  instantiate a memory injection utility, the memory injection utility injecting one or more hardware memory errors into the memory address space,
  tune one of a frequency of injection of the one or more hardware memory errors or an error density level of the one or more hardware memory errors injected into the memory address space,
  detect one or more memory access errors associated with the plurality of virtual machines based on the one or more hardware memory errors injected into the memory address space, the one or more memory access errors providing indication of a possible failure in executing the one or more processes, and
  correlate the one or more memory access errors detected with one or more memory locations associated with the memory address space; and
  an analysis utility that aggregates the correlated memory access errors to identify memory locations at which the one or more hardware memory errors are detected.

F11. The system of F10, wherein the instructions cause the one or more devices to tune the at least one memory address randomly.

F12. The system of F11 or F12, wherein the error density level comprises a number of errors randomly injected into a memory location associated with the memory address space.

F13. The system of any one of F10 to F12, wherein the instructions cause the one or more devices to vary a number of the plurality of virtual machines instantiated while varying the error density level.

F14. The system of any one of F10 to F13, wherein the instructions cause the one or more processing devices to vary workloads of the plurality of virtual machines instantiated.

F15. The system of any one of F10 to F14, wherein the memory address space comprises an address space used by the plurality of virtual machines instantiated.

F16. The system of any one of F10 to F15, wherein the memory address space comprises an entirety of the host machine address space.

F17. The system of any one of F10 to F16, wherein the instantiated memory injection utility filters injecting the hardware memory errors to one of a single row in dual in-line memory module (DIMM), a column in DIMM, or a data line in DIMM.

F18. A method for operating a hardware memory error tolerant software system, comprising:
  instantiating, on a host computer, a kernel agent in response to one or more requests to access hardware memory,
  determining, by the kernel agent based on the received information, whether the request to access memory will cause access to a corrupt memory location, and
  skipping, by the host computer, an operation associated with the corrupt memory location in response to determining that the request will access a corrupt memory location.

F19. The method of F18, wherein the received information comprises information identifying a kernel control path of an operating system of the computing device, the identified kernel control path comprises one of a kernel control path that performs house keeping operations or optimization operations.

F20. The method of F18 or F19, wherein the request to access memory comprises a request to access a page in memory and the instructions cause the one or more processing devices to skip an operation associated with the page in response to the determination that the request will access a corrupt memory location.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification, the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for determining memory error vulnerabilities associated with a software application, comprising:
    instantiating one or more virtual machines to run the software application,
    injecting at least one hardware memory error into guest memory locations accessible by the one or more virtual machines,
    detecting errors or software crashes based on the at least one hardware memory error injected into the guest memory locations and reported by the one or more virtual machines,
    determining one or more hardware memory errors of the at least one hardware memory error associated with the errors or software crashes reported by the one or more virtual machines, and
    flagging one or more instructions of the software application associated with the one or more hardware memory errors associated with the errors or software crashes reported by the one or more virtual machines;
    generating one or more kernel agents for applying to kernel control paths associated with corrupted memory locations associated with the errors or software crashes reported by the one or more virtual machines;
    causing one or more processing devices to skip or redirect an operation associated with the flagged one or more instructions of the software application associated with the corrupted memory locations associated with the errors or software crashes reported by the one or more virtual machines.

2. The method of claim 1, comprising varying a density associated with injecting the at least one hardware memory error.

3. The method of claim 2, wherein the density comprises a number of errors injected into the guest memory locations.

4. The method of claim 1, comprising varying an address range associated with injecting the at least one hardware memory error.

5. The method of claim 1, comprising varying an access frequency associated with injecting the at least one hardware memory error.

6. The method of claim 1, wherein determining one or more hardware memory errors comprises identifying one or more memory address locations associated with the errors or software crashes reported by the one or more virtual machines.

7. The method of claim 1, wherein flagging comprises identifying one or more code paths associated with the one or more instructions.

8. The method of claim 1, wherein flagging comprises identifying one or more instruction locations associated with the one or more instructions.

9. A host system, comprising:
    one or more processing devices;
    an input for receiving information indicating memory locations associated with hardware memory errors; and
    one or more memories storing instructions that cause the one or more processing devices to:
        instantiate one or more guest machines to run a software application,
        instantiate one or more kernel agents for applying to kernel control paths associated with corrupted memory locations associated with errors or software crashes associated with the software application,
        cause the one or more kernel agents to check if the memory access request will access a memory page having memory errors associated with the kernel control paths, and
        cause the one or more processing devices to skip or redirect an operation associated with the memory access request the one or more kernel agents indicate will access an errored memory location.

10. The host system of claim 9, wherein the memory errors comprise memory address locations identified in the received information as associated with errors or software crashes previously reported by a guest machine.

11. The host system of claim 9, wherein the kernel control paths comprise one of a kernel control path that performs house keeping operations or optimization operations.

12. The host system of claim 9, wherein the one or more guest machines comprise one or more virtual machines.

13. A host system, comprising:
    one or more processing devices;
    an input for receiving information indicating memory locations associated with possible hardware memory errors; and
    one or more memories storing instructions that cause the one or more processing devices to:
        instantiate one or more guest machines to run a software application, instantiate one or more kernel agents for applying to kernel control paths associated with corrupted memory locations associated with errors or software crashes associated with the software application, cause the one or more kernel agents to check if the memory access request will access a memory location having memory errors associated with the kernel control paths, and cause the one or more processing devices to avoid an errored memory location associated with a memory access request the one or more kernel agents indicate will access the errored memory location.

14. The host system of claim 13, wherein the memory errors comprise memory address locations identified in the received information as associated with errors or software crashes previously reported by a guest machine.

15. The host system of claim 13, wherein the kernel control paths comprise one of a kernel control path that performs house keeping operations or optimization operations.

16. The host system of claim 13, wherein the one or more guest machines comprise one or more virtual machines.

\* \* \* \* \*